(12) United States Patent
Kramer

(10) Patent No.: US 7,076,764 B2
(45) Date of Patent: Jul. 11, 2006

(54) SYSTEM AND METHOD FOR SOFTWARE MODULE ARCHITECTURE LANGUAGE AND COMPLIANCE CHECKING

(75) Inventor: Reto Kramer, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 168 days.

(21) Appl. No.: 10/655,059

(22) Filed: Sep. 4, 2003

(65) Prior Publication Data

US 2004/0133875 A1    Jul. 8, 2004

Related U.S. Application Data

(60) Provisional application No. 60/450,839, filed on Feb. 28, 2003, provisional application No. 60/408,697, filed on Sep. 5, 2002.

(51) Int. Cl.
   *G06F 9/44*    (2006.01)
(52) U.S. Cl. .................. 717/120; 717/102; 717/117
(58) Field of Classification Search ........ 717/100–122, 717/168–178
   See application file for complete search history.

(56) References Cited

U.S. PATENT DOCUMENTS

| 5,640,567 | A  | * | 6/1997 | Phipps ................... 717/121 |
| 6,725,452 | B1 | * | 4/2004 | Te'eni et al. .............. 717/168 |
| 2002/0129347 | A1 | * | 9/2002 | Fischer ................... 717/168 |
| 2003/0018963 | A1 |  | 1/2003 | Ashworth et al. |
| 2003/0131338 | A1 | * | 7/2003 | Georgalas ................ 717/104 |
| 2004/0015540 | A1 |  | 1/2004 | Solano et al. |
| 2004/0015833 | A1 |  | 1/2004 | Dellarocas et al. |
| 2004/0015946 | A1 | * | 1/2004 | Te'eni et al. ............. 717/169 |
| 2004/0205689 | A1 |  | 10/2004 | Ellens et al. |

OTHER PUBLICATIONS

Zisman-Emmerich-Finkelstein, Using XML to Build Consistency Rules for Distributed Specifications, Nov. 2000, Proceedings of the Tenth International Workshop on Software Specification and Design, 2000 IEEE.*

Tools for VisualAge version 2.0, 3.0 and Beyond, Aug. 2001, http://web.archive.org/web/20010803042309/http://javadude.com/vaj/resources/tools2x.html.* iDarwin, The JAVA Software Architecture Evolution Tool, Feb. 2000, http:////www.jugs.ch/html/events/2000/iDarwin.ppt.*

* cited by examiner

*Primary Examiner*—Antony Nguyen-Ba
(74) *Attorney, Agent, or Firm*—Fliesler Meyer LLP

(57) ABSTRACT

A system and method for providing a software module architecture specification language, and checking code for compliance. A module architecture specification can be structured into product-wide groundrules (applicable to all subsystems), and into subsystem-, layer- or even module-specific rules. The system parses the specifications automatically using the notion of rule specificness, and detects contradictory statements. This makes it easy to capture the intent of refactoring efforts and is an effective tool in ensuring that refactored code modules do not suffer from subsequent unnoticed dependency-creep.

34 Claims, 11 Drawing Sheets

```
1:  DSPEC groundrules IS // groundrules.depend
2:
3:  LET
4:  libraries = { java.* antlr.* }
5:  backplane = { com.rsys.cluster.*
6:  com.rsys.common.*
7:  com.rsys.time.* }
8:  ejb = com.rsys.ejb20.*
9:  jms = com.rsys.jms.*
10: servlet = com.rsys.servlet.*
11: connector = com.rsys.connector.*
12: IN
15: // Isolate the containers in general
16: ISOLATE ejb
17: FROM jms
18: FROM servlet
19: FROM connector
20:
21: // The basic layering for all subsystems
22: LAYER {ejb jms servlet connector}
23: ABOVE backplane
24: ABOVE libraries // bottom layer
25:
26: // ok, specific EJB -> JMS dependency
27: ALLOW com.rsys.ejb20.mdb.*
28  TO com.rsys.jms.QueueImpl
29: END
```

```
1: ...
2: Found rule VIOLATION, dependency:
3: FROM "a.A"
4: TO "p.P"
5: violates a rule in rules.depend, line 4:
6: PREVENT a.*
7: TO p.*
8: ...
9: 1 errors (rule violations) found.
```

Figure 5

```
1: ...
2: ...
3: PREC 1 // resolves C1
4: ALLOW * TO java.* // groundrule
5:
6: PREVENT com.foo.* TO *
7: ALLOW com.foo.* TO com.foo.*
8:
9: PREVENT com.foo.bar.* TO com.boo.*
10: ALLOW * TO com.boo.boo.*
11:
12: ALLOW com.foo.bar.* TO com.boo.boo.* // C2
13: PREVENT com.foo.* TO com.boo.boo.* // C3
14: ...
```

Figure 7

```
desugaring ...
produced 7 rules.

finding contradictions among rules ...
no contradictions found among the 7 desugared
rules. The following contradictions were
explicitly resolved ...
data/test12a:6: ALLOW (*) TO (java.*) [prec 1]
resolves a contradiction among
data/test12a:6: and data/test12a:7:
where:
ALLOW (*) TO (java.*) [prec 1]
had otherwise contradicted with
PREVENT (com.foo.*) TO (*) [prec 0]
data/test12a:13: ALLOW (com.foo.bar.*)
TO (com.boo.boo.*) [prec 0]
resolves a contradiction among
data/test12a:10: and data/test12a:12:
where:
PREVENT (com.foo.bar.*)
TO (com.boo.*) [prec 0]
had otherwise contradicted with
ALLOW (*) TO (com.boo.boo.*) [prec 0]
data/test12a:14: PREVENT (com.foo.*)
TO (com.boo.boo.*) [prec 0]
resolves a contradiction among
data/test12a:7: and data/test12a:12:
where:
PREVENT (com.foo.*) TO (*) [prec 0]
had otherwise contradicted with
ALLOW (*) TO (com.boo.boo.*) [prec 0]

finding unneeded prec annotations on rules ...
none found.

simplifying rules ...
produced 6 simplified rules.
the 1 simplifications were:
removed: data/test12a:10:
PREVENT (com.foo.bar.*)
TO (com.boo.*) [prec 0]
because is's implied by rule
data/test12a:7: PREVENT (com.foo.*)
TO (*) [prec 0]

grouping rules ...
grouping (pairwise) 6 rules ...
reduced the specification to 6 rules.
grouping (with reordering) 6 rules ...
reduced the specification to 6 rules.

generating match instructions ...
produced 6 match instructions.
```

```
file a.depend
1: DSPEC a IS
2: EXPORT lib
3: LET lib = {java.* com.apache.* ...} IN END file b.depend
1: DSPEC b IS
2: IMPORT lib FROM a AS lib_a
3: LET lib = {com.rsys.common.* antlr.* lib_a}
4: // a pattern and a binding name
5: IN ALLOW com.foo.* TO lib
6: ...
7: END
```

Figure 10

SYSTEM AND METHOD FOR SOFTWARE MODULE ARCHITECTURE LANGUAGE AND COMPLIANCE CHECKING

CLAIM OF PRIORITY

This application claims the benefit of U.S. Provisional Application No. 60/408,697, filed Sep. 5, 2002 and claims the benefit of U.S. Provisional Patent Application Ser. No. 60/450,839, filed Feb. 28, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to systems for software development, and particularly to a system and method for determining and supporting dependencies between objects or modules in a software development project.

BACKGROUND

A complex software project or software system may include multiple modules, components, or objects, each of which may relate to one another in some manner. Of particular importance are those relations in which a module (or component, object, etc.) depends on another module for some functionality. This creates a dependency by one module on the other, or between the modules. If the independent module is changed, then care must be taken that the dependent module is similarly changed, or will not fail in some way because of the change. For ease of development, modules may also be grouped and developed in layers, or as subsystems of a larger, more complex system. However, popular programming languages such as the JAVA™ programming language cannot express dependencies and module architecture relations such as layers and subsystems. These relations inherently span multiple modules (i.e. packages in the JAVA™ programming language) and hence they cannot be captured within the programming language's concepts. What is needed is a more formalized approach to managing relations and dependencies between software modules to ensure better compliance with the overall software architecture.

SUMMARY

Disclosed herein is a system and method for module architecture specification that allows developers to maintain and control the module dependency structure of their products in a pragmatic, cost effective way over the long lifetime of large-scale, development and maintenance projects. As described herein, an embodiment of the system referred to as "IDARWIN" includes a specification language together with a set of tools that check software code, for example JAVA™ programming language source-code and class files, for adherence to a set of specifications. Unlike the use of "module architecture diagrams" (the typical picture of layered software) which are highly ambiguous, an IDARWIN module architecture specification is precise and can be checked automatically. If the code deviates from the desired structure, developers are alerted without delay and can either revise the module architecture description, or remove non compliant code dependencies. IDARWIN is thus a cost effective early warning system that helps to stop a particularly expensive form of code-aging.

Load-time linking in the JAVA™ programming language makes the issue of "dependency creep" particularly acute. While one can maintain layer- or subsystem-dependencies using build systems such as "make" or "ant" by carefully controlling the class path that is presented to the compiler runs for each subsystem, in practice this is done very rarely, since it is tedious and hard to adapt. As a result, a lower layer in a system can unintentionally start to depend on a higher layer due to a code-change. In accordance with one embodiment IDARWIN determines static dependencies among classes and interfaces in JAVA™ programming language source- and class-files. Next it reads a set of module architecture specification files which it composes into a single compound specification, and then checks each code dependency against the compound specification to find:

the code dependencies that violate the module architecture;
the code dependencies that evade coverage by statements in the specification;
redundant and obsolete specification statements.

An important feature of the invention is the ability to present multiple specifications to IDARWIN, so as to allow both subsystem and layer "owners", i.e. the developers of these components, to author their own specifications from their individual perspective. These alternate views will sometimes overlap and in these cases IDARWIN contains a sophisticated mechanism to detect and resolve contradictory specification statements.

BRIEF DESCRIPTION OF THE DRAWINGS

FIG. 4 shows a specification example in accordance with an embodiment of the invention.

FIG. 5 shows an error report in accordance with an embodiment of the invention.

FIG. 7 shows a specification example in accordance with an embodiment of the invention.

FIG. 8 shows a verbose report in accordance with an embodiment of the invention.

FIG. 10 shows a specification example in accordance with an embodiment of the invention.

DETAILED DESCRIPTION

Figure 1:
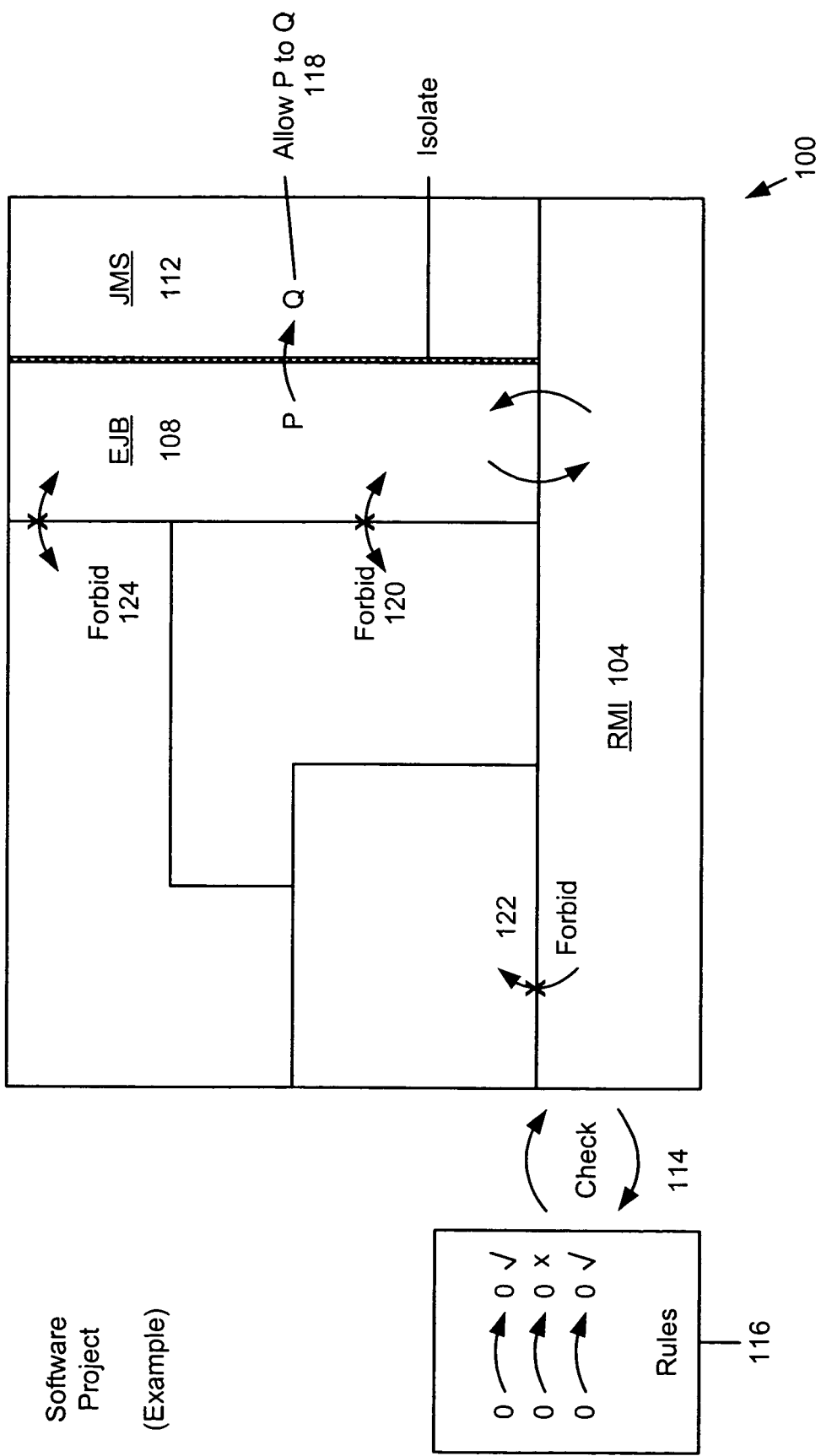
FIG. 1 shows an example of a software project including multiple modules that may be used with an embodiment of the invention.

Disclosed herein is a system and method for module architecture specification that allows developers to maintain and control the module dependency structure of their products in a pragmatic, cost effective way over the long lifetime of large-scale, development and maintenance projects. As described herein, an embodiment of the system referred to as "IDARWIN" includes a specification language together with a set of tools that check JAVA™ programming language source-code and class files for adherence to a set of specifications. Unlike "module architecture diagrams" which are highly ambiguous, an IDARWIN module architecture specification is precise and can be checked automatically. If the code deviates from the desired structure, developers are alerted without delay and can either revise the module architecture description, or remove non compliant code dependencies. IDARWIN is thus a cost effective early warning system that helps to stop a particularly expensive form of code-aging.

Load-time linking in the JAVA™ programming language makes the issue of "dependency creep" particularly acute. While one can maintain layer- or subsystem-dependencies using build systems such as "make" or "ant" by carefully controlling the class path that is presented to the compiler runs for each subsystem, in practice this is done very rarely, since it is tedious and hard to adapt. As a result, a lower layer in a system can unintentionally start to depend on a higher layer due to a code-change. In accordance with one embodiment IDARWIN determines static dependencies among classes and interfaces in JAVA™ programming language source- and class-files. Next it reads a set of module architecture specification files which it composes into a single compound specification, and then checks each code dependency against the compound specification to find:

the code dependencies that violate the module architecture;
the code dependencies that evade coverage by statements in the specification;
redundant and obsolete specification statements.

An important feature is the ability to present multiple specifications to IDARWIN, so as to allow both subsystem and layer "owners", i.e. the developers of these components, to author their own specifications from their individual perspective. These alternate views will sometimes overlap and in these cases IDARWIN contains a sophisticated mechanism to detect and resolve contradictory specification statements.

In practice, the IDARWIN system in accordance with one embodiment of the invention may be used to provide a software development environment by which software developers (programmers, architects, etc.) can formulate rules that are to be followed during the development of a "software project", i.e. a typically complex multi-module, multi-component, or multi-object software application. Particularly, these rules can be defined so as to allow, forbid, or constrain certain dependencies between software objects within the project. On a larger scale, the system can be used to allow, forbid, or constrain certain dependencies between software modules, or between the building blocks of large enterprise systems (essentially a larger scale "software project"). When the software project or enterprise system is built, for example at compile-time, the dependencies can be checked and verified against the rules. This serves as a positive check on the consistency of dependencies within the software project according to predefined architecture design/rules, and also allows a system architect or quality assurance (QA) team to identify any dependencies that may contravene those rules. A decision may then be made as to whether to, for example, change the rules, or eliminate the errant dependency.

FIG. 1 illustrates an example 100 of the type of software project or enterprise level system that may benefit from the use of the invention. As shown in FIG. 1, a software project may include various modules, such as RMI 104, EJB 108, and JMS 112 modules, each of which may be under the control of an individual software developer or development team. During compilation, (which in fast-moving businesses with lots of builds can take place every 60 minutes or so), dependencies between the software modules can be identified, and in accordance with an embodiment of the invention, checked 114 against a set of rules 116. Some rules 112 may specifically allow certain dependencies between the modules. Other rules 120, 122, 124 may specifically deny or forbid other such dependencies. Oftentimes the individual rules may be contradictory in what they allow or forbid, and require clarification. The set of rules themselves can be gathered from multiple sources, checked for consistencies, and sorted or rewritten for efficiency. In this way, each of the software modules can be independently developed with less concern that the calls they either make to other modules, or allow from other modules, will contravene the architecture rules laid down for the development of the entire software project or system. This allows large-scale projects to be developed by many different software developers or development teams, each perhaps with their own style and way of programming, while ensuring a consistency among the dependencies within the project. The result is a faster and more efficient development time, coupled with a more consistent and bug-free end product.

Figure 2:
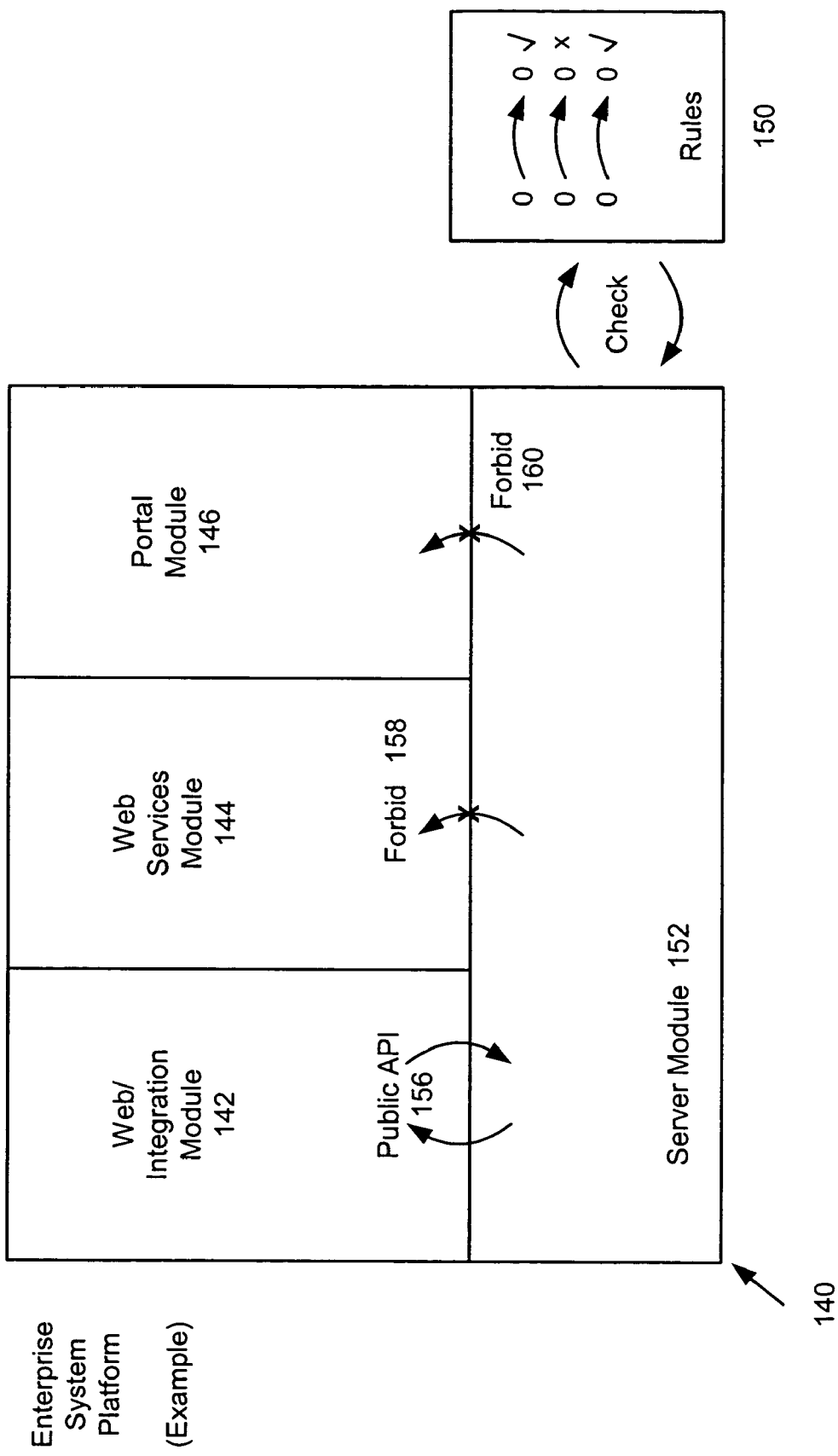
FIG. 2 shows an example of another software project including multiple modules that can be used with an embodiment of the invention.

FIG. 2 illustrates an alternate embodiment in which the compliance-checking system in accordance with the invention is used on an enterprise platform level to monitor dependencies between software components within a large scale system 140. Some components, such as a Web Integration Module 142, a Web Services module 144, a Portal module 146, and the like, may be defined by the rules as for example not being allowed to rely (i.e. are forbidden 158, 160 from relying) on other components for certain operations, i.e. they must operate independently as standalone components. Other rules may allow one component to talk to another component, for example a server module 152, via a public interface (API) 156. Using a rules-based module architecture checking system as described herein ensures that when the individual components are shipped to the marketplace, there is less chance that they will fail later because of an undiscovered dependency problem.

The following section presents a simple module architecture specification with LAYER and ISOLATE statements. Subsequent sections describe the core language features, such as rules and patterns, as well as how rules are composed and checked against dependencies extracted from the code; the central notion of "rule contradiction"; extended-language statements, such as LAYER and ISOLATE; the meaning of extended-language statements and how they are desugared into core-language rules and patterns; and additional embodiments and conclusions.

Figure 3:
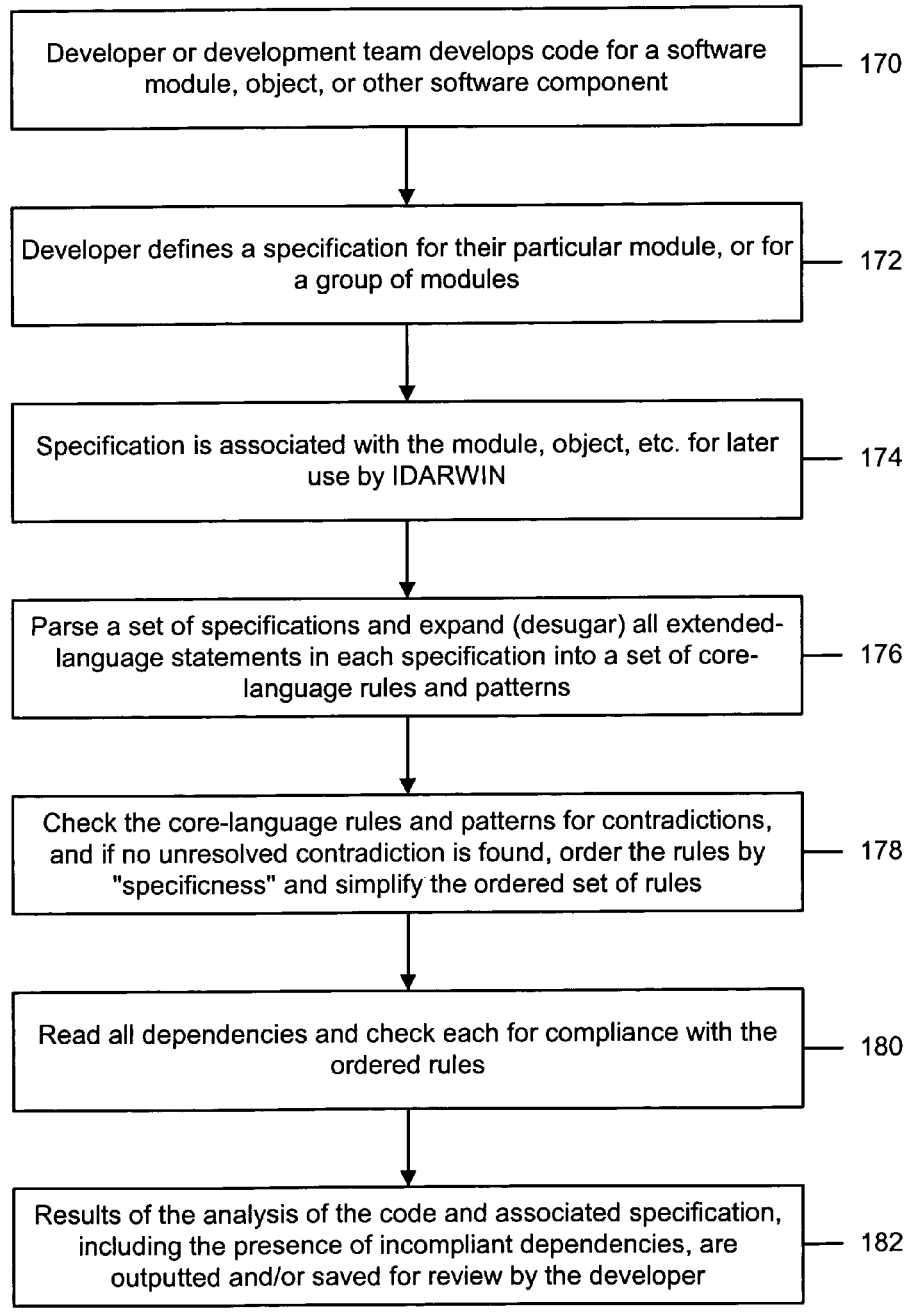
FIG. 3 shows a flowchart of a compliance checking process in accordance with an embodiment of the invention.

FIG. 3 shows a flowchart of a process in accordance with an embodiment of the invention illustrating how the IDARWIN system is used to assist a developer in maintaining consistency of their code. As shown in FIG. 3, in step 170, a developer or development team develops code for a software module, object, or other software component. In step 172, the developer is allowed to define a specification for their particular module, or for a group of modules. The specification defines any dependencies or restrictions that should preferably be associated with their module, for example dependencies on other modules, isolations, or layering. In step 174 the specification is associated with the module, object, etc. for later use by IDARWIN. Steps 176, 178 and 180 are performed by the IDARWIN system. Typically, steps 176 and 178 are performed each time the specification for a module is changed, while steps 176, 178 and 180 are performed any time the module's code is changed together with the specification. In step 176 a set of specifications is parsed and all extended-language statements are expanded (desugared) in each specification into a set of core-language rules and patterns. In step 178, the set of all core-language rules and patterns is checked for contradictions, and if no unresolved contradiction is found, the rules are ordered by "specificness", and the ordered set is simplified. In step 180, all dependencies are read and each is checked for compliance with the ordered rules. In step 182, the results of the IDARWIN analysis of the code and associated specification, including the presence of incompliant dependencies, is output or saved for later review by the developer.

Simple Example

FIG. 4 shows an example specification groundrules 170 which illustrates some of the language constructs available to describe a desired module architecture. The specification starts with some abbreviations for patterns (lines 4–11) which are then used in the context of the ISOLATE, LAYER and ALLOW statements. IDARWIN is a purely declarative language, hence the order of the architecture statements is irrelevant. In this example the ISOLATE statement prevents any dependencies among types that match its argument patterns. The LAYER statement prevents lower layers from referring to upper layers. The ALLOW statement declares an exception to the above statements.

Assume the code checked against this specification contains the type com.rsys.cluster.Cluster, which depends on com.rsys.jms.Destination. This dependency is flagged as a violation of the LAYER statement at line 22, because the Cluster type is part of the backplane pattern (line 5), whereas the Destination type is part of the jms pattern (line 9). The LAYER statement prevents such upward dependency. The precise meaning of the LAYER and ISOLATE statement is defined in later sections.

The need for some exceptions to the groundrules often arises. Generally speaking, the groundrules should apply to all subsystems of a project, but some specific pair of subsystems may need to allow for a few, well-known dependencies that violate the groundrules. For example, assume the ejb subsystem needs to refer to a type in the jms subsystem. As shown in FIG. 4, line 27 allows for such an exception by specifically stating that every type in package com.rsys.ejb20.mdb may refer to com.rsys.jms.QueueImpl. This ALLOW statement is a refinement of the coarser ISOLATE statement at line 16 and IDARWIN automatically determines that the ALLOW statement takes precedence. If a rule violation is found, an error report 180 is printed, such as that shown in FIG. 5. If a groundrule is unsuitable in the context of a specific layer or subsystem, then the owner of that subsystem can override the groundrules within their realm.

Module Architecture Specification

The IDARWIN is based on a core language of two basic elements. The central concepts are the pattern, which is used to capture a set of class-, interface- and package-names, and two kinds of rules. Macro style core language extensions provide the user with convenient abstractions, such as the concept of layers and isolation. A subsystem may consist of many packages, and one might want to exclude certain subpackages. A pattern captures such configurations. The pattern language is limited (i.e. no regular expressions) for two reasons:

1. the notion of rule ordering and rule contradiction, which is central to IDARWIN's ability to compose independently authored specifications, relies on the existence of an ordering relation between rules. Such an ordering relation requires the pattern language to be limited so as to only allow wildcards at the end of the pattern. In practice this is to not a limiting factor.

2. it makes the language closer to the familiar JAVA™ programming language import patterns.

As illustrated in FIG. 3 above, IDARWIN operates in three steps. Steps one and two only have to be performed if the specification changed, while step three must be run whenever the code changed.

1. parse a set of specifications and expand (desugar) all extended-language statements in each specification into a set of core-language rules and patterns 2. check the set of all core-language rules and patterns for contradictions, and if no unresolved contradiction is found, order the rules by "specificness" and simplify the ordered set of rules 3. reads all dependencies and checks each for compliance with the ordered rules.

Core Language

The core language is made up of three atomic and two compound patterns as well as two kinds of rules. Atomic patterns are either fully qualified class and interface names (called "name patterns"), or wildcard patterns (called "children" and "descendent patterns"). Compound patterns combine patterns by forming their union and difference. The syntax of patterns is:

a fully qualified class-and interface-name is an atomic, name pattern, e.g. java.lang.Object.

p.* is an atomic, descendent pattern, e.g. java.lang.*, where p is the package of the pattern (java.lang)

p.# is an atomic, children pattern, e.g. java.lang.#, where p is the package of the pattern (java.lang). p.# only matches with names in package p, but not with any subpackages.

the sum of two patterns (p+q) is a compound, union pattern, e.g. java.lang.*+java.util.List the difference of two patterns (p−q) is a compound, difference pattern, e.g. java.lang.*−java.lang.Object Definitions 1–6 shown below capture the notion of pattern "matching" and pattern "subsumption". An atomic name pattern a "matches" a pattern p (atomic or compound), and is written as a $\leq_p$ p. A pattern p "subsumes" a pattern q, and is written a $\leq_p$ q. The meaning (written as [[e]]) of the $\leq_p$ pattern relation is given in terms of familiar set theory, Boolean logic and the string prefix $\leq$relation. P denotes the set of all package name strings, and C denotes the set of all class and interface names. The variables r, s and t denote atomic and compound patterns. A denotes an atomic pattern. N and M as well as p and q denote a string. The $\leq_p$ relation, +, − as well as .* and .# are part of the core language alphabet.

The intuitive meaning of the $\leq p$ relation is based on the interpretation of patterns as sets of strings (where the strings are class and interface names).

$$[\![r \leq_p s]\!] \stackrel{def}{=} [\![r]\!] \subseteq [\![s]\!] \qquad (1)$$

$$[\![r + s]\!] \stackrel{def}{=} [\![r]\!] \cup [\![s]\!] \qquad (2)$$

$$[\![r - s]\!] \stackrel{def}{=} [\![r]\!] \setminus [\![s]\!] \qquad (3)$$

$$[\![p.N]\!] \stackrel{def}{=} \{p.N\} \qquad (4)$$

$$[\![p.\#]\!] \stackrel{def}{=} \{p.M \mid M \in C\} \qquad (5)$$

$$[\![p.*]\!] \stackrel{def}{=} \{q.M \mid p \leq q \wedge q \in P \wedge M \in C\} \qquad (6)$$

IDARWIN uses the following syntactic rewrite rules to evaluate pattern "matching" (definitions 11, 14, 17) and "pattern subsumption" (definitions 7–19). Here [[e]] reduces the relation e to terms involving the $\leq$(string prefix) and $\doteq$(string equal) relation over strings and Boolean logic.

$$[\![r \leq_p s + t]\!] \stackrel{def}{=} [\![r \leq_p s]\!] \vee [\![r \leq_p t]\!] \qquad (7)$$

$$[\![r \leq_p s - t]\!] \stackrel{def}{=} [\![r \leq_p s]\!] \wedge \neg [\![r \leq_p t]\!] \qquad (8)$$

$$[\![r + s \leq_p a]\!] \stackrel{def}{=} [\![r \leq_p a]\!] \wedge [\![s \leq_p a]\!] \qquad (9)$$

$$[\![r - s \leq_p a]\!] \stackrel{def}{=} [\![r \leq_p a]\!] \qquad (10)$$

$$[\![p.N \leq_p q.M]\!] \stackrel{def}{=} [\![p \doteq q]\!] \wedge [\![N \doteq M]\!] \qquad (11)$$

$$[\![p.\# \leq_p q.M]\!] \stackrel{def}{=} false \qquad (12)$$

$$[\![p.* \leq_p q.M]\!] \stackrel{def}{=} false \qquad (13)$$

$$[\![p.N \leq_p q.\#]\!] \stackrel{def}{=} [\![q \leq p]\!] \qquad (14)$$

$$[\![p.\# \leq_p q.\#]\!] \stackrel{def}{=} [\![p \doteq q]\!] \qquad (15)$$

$$[\![p.* \leq_p q.\#]\!] \stackrel{def}{=} false \qquad (16)$$

$$[\![p.N \leq_p q.*]\!] \stackrel{def}{=} [\![q \leq p]\!] \qquad (17)$$

$$[\![p.\# \leq_p q.*]\!] \stackrel{def}{=} [\![q \leq p]\!] \qquad (18)$$

$$[\![p.* \leq_p q.*]\!] \stackrel{def}{=} [\![p \doteq q]\!] \qquad (19)$$

Rules

A dependency is defined as a pair of fully qualified class-or interface-names (atomic name patterns), e.g. (java.util.Iterator, java.lang.Object). The core language of IDARWIN contains two kinds of rules, the (ALLOW p, q) and the (PREVENT p, q) rule. Both take two patterns as arguments. Shown below the dependency match relation ($\leq$d) between a dependency and a rule is defined using the previously defined pattern match relation between a patterns ($\leq$p). Here a and b are atomic name patterns, p and q are patterns (atomic or compound).

$$(a, b) \leq_d (\text{PREVENT } p, q) \stackrel{def}{=} a \leq_p p \wedge b \leq_p q$$

$$(a, b) \leq_d (\text{ALLOW } p, q) \stackrel{def}{=} a \leq_p p \wedge b \leq_p q$$

For example:

- (java.util.Iterator, java.lang.object) $\leq_d$
  (ALLOW java.util.* java.*)
- (java.util.Iterator, java.lang.object)
  $\not\leq_d$ (PREVENT java.lang.* java.*)

Rule Precedence

The notion of rule precedence is central to the ability to allow users to specify many independent specifications and then compose them. During processing IDARWIN orders the rules, so that the most specific rule is checked first, and hence dominates a less specific rule. This allows for the intuitive notion of "rule X is an exception to the general rule Y". Using the previously defined inclusion relation between patterns, it is possible to define what it means for a rule to be equal to or more specific than another rule.

$$(\text{PREVENT } p, q) \leq_r (\text{PREVENT } r, s) \stackrel{def}{=} p \leq_p r \wedge q \leq_p s$$

$$(\text{ALLOW } p, q) \leq_r (\text{ALLOW } r, s) \stackrel{def}{=} p \leq_p r \wedge q \leq_p s$$

$$(\text{PREVENT } p, q) \leq_r (\text{ALLOW } r, s) \stackrel{def}{=} p \leq_p r \wedge q \leq_p s$$

$$(\text{ALLOW } p, q) \leq_r (\text{PREVENT } r, s) \stackrel{def}{=} p \leq_p r \wedge q \leq_p s$$

For example:

- (ALLOW java.util.* java.lang.*) $\leq_r$
  (ALLOW java.util.* java.*)
- (ALLOW java.util.jar.* java.lang.*) $\leq_r$
  (ALLOW java.util.* java.*)
- (ALLOW java.* java.lang.*) $\not\leq_r$ (ALLOW java.util.* java.*)
- (ALLOW java.* java.*) $\not\leq_r$ (ALLOW org.apache.* java.*)

A set of rules can now be sorted using the above relation. For example, assume we have a set that contains (PREVENT java.util.* java.lang.*),(ALLOW java.util.jar.JarFile java.lang.Object) and (PREVENT * java.*), the sorting would lead to the following order, where the most specific rule comes first:

1. (ALLOW java.util.jar.JarFile java.lang.Object)
2. (PREVENT java.util.* java.lang.*)
3. (PREVENT * java.*)

Later we will see that IDARWIN will remove the second rule as an optimization since it is subsumed by the third rule, since they are of the same polarity.

Rule Simplification

We define the polarity $\pi(r)$ of a rule r as:

$$\pi(\text{ALLOW } p, q) \stackrel{def}{=} \text{True}$$

$$\pi(\text{PREVENT } p, q) \stackrel{def}{=} \text{False}$$

Polarity is a simple way to determine the "type" of a rule (it is ALLOW or PREVENT). The notion of polarity is used to define two performance related simplifications:

A rule r is dropped, if it immediately precedes another rule s and $r \leq_r s$ and $\pi(r)=\pi(s)$. Duplicate rules are removed as a special case. For example, if the ordered set of rules is: (ALLOW foo.* bar.*) followed by (ALLOW * bar.*), then the former rule will be removed because it's subsumed by the latter and both are of the same polarity. If the set is however (ALLOW foo.* bar.boo.*), (PREVENT * bar.boo.*) followed by (ALLOW * bar.*), then the first rule can not be eliminated since it's not immediately followed by a rule of the same polarity.

Two rules r and S are merged, if they immediate follow each other, are of the same polarity $\pi(r)=\pi(s)$ and are of the form: (ALLOW a b), (ALLOW a c). Then the merged rule will be (ALLOW a b+c). If possible the first argument to ALLOW will be merged symmetrically. The same applies to the PREVENT rule.

Rule Contradiction

There is a catch to the ordering defined above. For example if we have the following two rules: (PREVENT com.foo.* *) and (ALLOW * java.*), their order is undefined since neither is a subset of the other:

- (PREVENT com.foo.* *) $\not\leq_r$ (ALLOW * java.*), since com.foo.* $\leq_p$ *, but * $\not\leq_p$ java.*
- (ALLOW * java.*) $\not\leq_r$ (PREVENT com.foo.* *), since * $\not\leq_p$ com.foo.*, despite java.* $\leq_p$ *

Since the two rules have different polarity (one is an ALLOW rule, while the other is a PREVENT rule), the fact that the order among them is undefined leads to an ambiguous result when a dependency is checked against them. For example, the dependency (com.foo.Bar, java.lang.Object) matches both rules, so depending on which rule is checked first, the dependency triggers an ALLOW or a PREVENT action. In the latter case the dependency will be marked as a specification violation, whereas in the former case the dependency would be accepted as specification compliant. The above rules leave it unclear whether a dependency that matches (ALLOW com.foo.* java.*) and (PREVENT com.foo.* java.*) should be accepted or rejected since both rules apply. Such ambiguity is clearly unacceptable.

Figure 6:
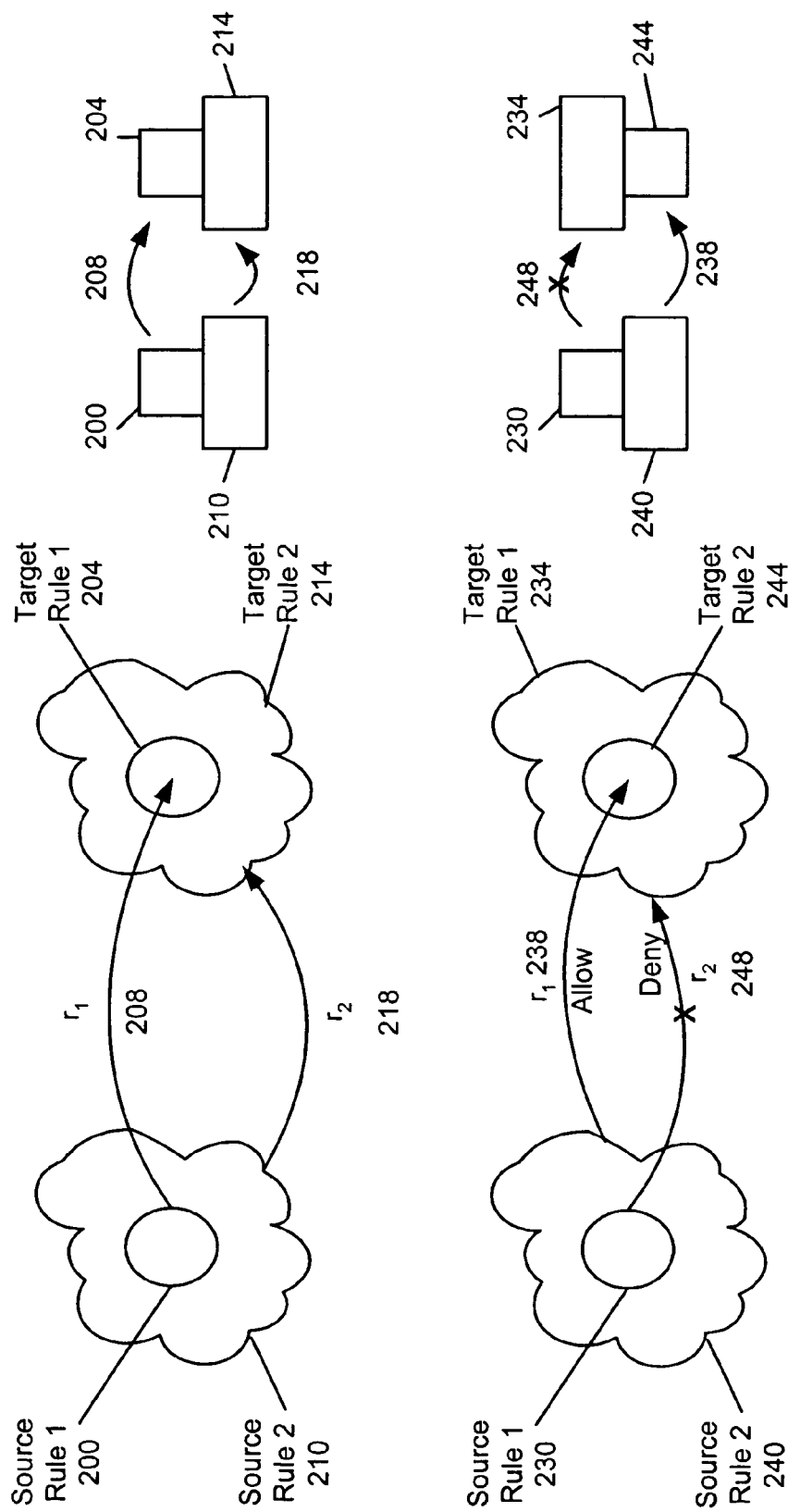
FIG. 6 shows an illustration of two source and target rules, as may be used with an embodiment of the invention.

FIG. 6 illustrates the problem. When the source 200 and the target 204 of the first rule 208 (rule 1, r1) are both subsets, respectively, of the source 210 and the target 214 of the second rule 218 (rule 2, r2), then there is no problem, since the first rule can be totally included within (more appropriately is more specific than) the second rule. The first rule then gains precedence over the second rule. However, when either the source 230 or the target 234 of the first rule 236 is NOT a subset, respectively, of the source 240 and the target 244 of the second rule 248, then there may be a problem, since the first rule cannot be totally included within (is not more specific than) the second rule. Nor can the second rule be totally included within the first rule (since it's no more specific either). This is when a possible contradiction arises.

A simple way to avoid the above contradiction is to rewrite the rules slightly and state, for example: (PREVENT com.foo.* (*-java.*)) and (ALLOW * java.*). Now the two rules do not conflict anymore since any dependency that matches the first rule won't match the second and vice versa, since (*-java.*) and java.* are disjoint. The notion of contradiction defined below will take this into account.

In accordance with one embodiment of the invention, a specification is defined to be inconsistent if there is at least one pair of rules that contradict each other. Later we will refine this definition to allow for the ability to explicitly resolve contradictions by either supplementing a "resolver-rule", or by annotating contradicting rules with precedence levels.

If two rules a and b contradict each other, we write ab, where is defined below. Assuming that the patterns p, q, r and s are not union pattens:

$$(\text{PREVENT } p, q) \otimes (\text{ALLOW } r, s) \stackrel{def}{=} p = r \wedge q = s$$
$$\vee \ (p <_p r \wedge s <_p q)$$
$$\vee \ (r <_p p \wedge q <_p s))$$

$$(\text{ALLOW } p, q) \otimes (\text{PREVENT } r, s) \stackrel{def}{=} p = r \wedge q = s$$
$$\vee \ (p <_p r \wedge s <_p q)$$
$$\vee \ (r <_p p \wedge q <_p s))$$

$$(\text{PREVENT } p, q) \otimes (\text{PREVENT } r, s) \stackrel{def}{=} \text{False}$$

$$(\text{ALLOW } p, q) \otimes (\text{ALLOW } r, s) \stackrel{def}{=} \text{False}$$

If the rules contain union patterns, they must be split:

$$(\text{PREVENT }(t+u), q) \otimes (\text{ALLOW } r, s) \stackrel{def}{=}$$
$$(\text{PREVENT } t, q) \otimes (\text{ALLOW } r, s) \vee (\text{PREVENT } u, q) \otimes (\text{ALLOW } r, s)$$

$$(\text{PREVENT } p, (t+u)) \otimes (\text{ALLOW } r, s) \stackrel{def}{=}$$
$$(\text{PREVENT } p, t) \otimes (\text{ALLOW } r, s) \vee (\text{PREVENT } p, u) \otimes (\text{ALLOW } r, s)$$

Example contradictions (PREVENT * *)⊗(ALLOW * *)

(PREVENT com.foo.* *)⊗(ALLOW * java.*)

These are not contradictions (PREVENT com.foo.* *-java.*) does not contradict (ALLOW * java.*), because java.* $\not\leq_p$(*-java) and (*-java.*) ⊗java.*, i.e. the two patterns are disjoint.

(PREVENT com.foo.* *) does not contradict (ALLOW com.foo.* java.*), since the latter is simply a refinement of the former rule.

Rule Contradiction Resolution

There are two ways to resolve rule contradictions:

The user may provide additional resolver rules that are included for the expressed purpose of clarifying the specification. In the above example, where (PREVENT com.foo.* *) and (ALLOW * java.*) contradict each other, either of the following two rules resolves the contradiction by clarifying the polarity for the overlapping patterns: (ALLOW com.foo.* java.*) or (PREVENT com.foo.* java.*).

The user may annotate the specification statements (and thus the desugared core language rules) with explicit precedence levels (integers, where a higher number dominates over a lower number). The user can tag either of the contradicting rules (PREVENT com.foo.* *) or (ALLOW * java.*) with a precedence annotation. For example (PREC 1 ALLOW * java.*) and (PREVENT com.foo.* *) do not contradict (the default precedence level is 0).

During operation, the IDARWIN systems desugars a module architecture specification into a set of rules S. If the rules are consistent, we order them using the $\leq_r$ relation, to create an ordered set of rules O. The set of rules are now ready to be applied and checked against each dependency presented to the tool.

If the rules are inconsistent (i.e. there is at least one contradicting pair of rules), a few intermediate steps must be taken to arrive at O. First, the rules involved in contradictions (call this set of pairs of rules C) are determined by pair wise checking all rules in S. For example, after desugaring extended language statements into core language rules we may have the unordered set of rules S 270 as shown in FIG. 7.

---

IDARWIN will find three contradictions (C contains these three pairs) hence the specification is inconsistent:
1. $C_1$ = (ALLOW * java.*) ⊗(PREVENT com.foo.* *)
2. $C_2$ = (PREVENT com.foo.bar.* com.boo.*)⊗ (ALLOW * com.boo.boo.*)
3. $C_3$ = ((PREVENT com.foo.* *) ⊗(ALLOW * com.boo.boo.*)

---

Next, for each contradiction (a pair (p, q) of rules) in C, the set S\{p, q} is searched for a contradiction resolver. A rule r resolves a contradiction (p, q)∈C (two rules contradicting each other), if and only if r<$_r$p^ (AND) r<$_r$q, meaning r is more specific than both p and q. A resolved contradiction is removed from C, the resolver rules is added to the set of resolvers R and removed from S. This process is repeated until all resolver rules are found.

In the above example, shown in FIG. 7, the rules at line 12 and 13 resolve the contradictions $C_2$ and $C_3$ respectively.

Now we have the three sets: the resolvers R, the remaining contradictions that were not resolved C−R, and the rules that do not contradict each other minus the resolvers that were moved to R, S−C−R.

The user can annotate each rule that is involved in a contradiction with a precedence level (during desugaring this precedence level is passed on). The remaining unresolved contradicting rules in C−R are ordered by precedence. If the user gave no precedence to the rules, IDARWIN exits with an error reporting the contradictions remain unsolved.

In the above example, shown in FIG. 7, the rule at line 3 and 4 resolves the contradiction $C_1$ by specifically giving the (ALLOW * java.*) precedence. All contradictions are thus resolved.

Now, we form the union O=R+o$_p$(C−R)+o$_{\leq r}$(S−C−R), where o$_p$ means ordered by precedence annotation and o$_{\leq r}$ means ordered by rule specificness.

The toolkit's verbose mode 280, as illustrated for example in FIG. 8, displays the above reasoning steps to the user. The rules are checked in this order (O set):
1. ALLOW (com.foo.bar.*) (com.boo.boo.*)[prec0]
2. PREVENT (com.foo.*) (com.boo.boo.*) [prec 0]
3. ALLOW (*) TO (java.*) [prec 1]
4. ALLOW (com.foo.*) TO (com.foo.*) [prec 0]
5. PREVENT (com.foo.*) TO (*) [prec 0]
6. ALLOW (*) TO (com.boo.boo.*) [prec 0]

Rule precedence is only invoked for rules that are involved in a contradiction. Therefore rule precedence annotations cannot be used to control the order of rule evaluation. In the above example, rule 3 has precedence 1, which lets it dominate rule 5.

Rule Checking Process

Assuming the system has a consistent set of rules O (all existing contradictions resolved through the above process), then a dependency d is checked against the rules following these steps.
1. iterate through all rules O until a rule r is found that matches the dependency d, d≤$_d$r.
2. if no rule matches the dependency, then the dependency is accepted and adheres to the specification. A warning is issued to state that the dependency is not covered by the specification prompting the user to complement the specification with a statement about the dependency specifically, or the packages involved. This is an important software development tool in order to keep module specifications up to date with code-structure changes (e.g. a new library is used, that is not mentioned in any rule yet).
3. if a rule matches d and it's polarity π(r)=True then the dependency is accepted and adheres to the specification. The rule r is added to the set of used rules U.
4. if a rule matches and it's polarity π(r)=False then the dependency is rejected and IDARWIN prints an error report stating that the dependency d violates rule r and does not adhere to the specification. The rule r is added to the set of used rules U.

After all dependencies have been presented to IDARWIN, all rules that were not used (i.e. the set of O−U), can be printed, so that the user can update the specification and remove potentially outdated rules. This is an important tool to keep the specification in sync with code changes (e.g. a library is not longer used in the code, so all rules that refer to this library can be detected and purged).

Figure 9:
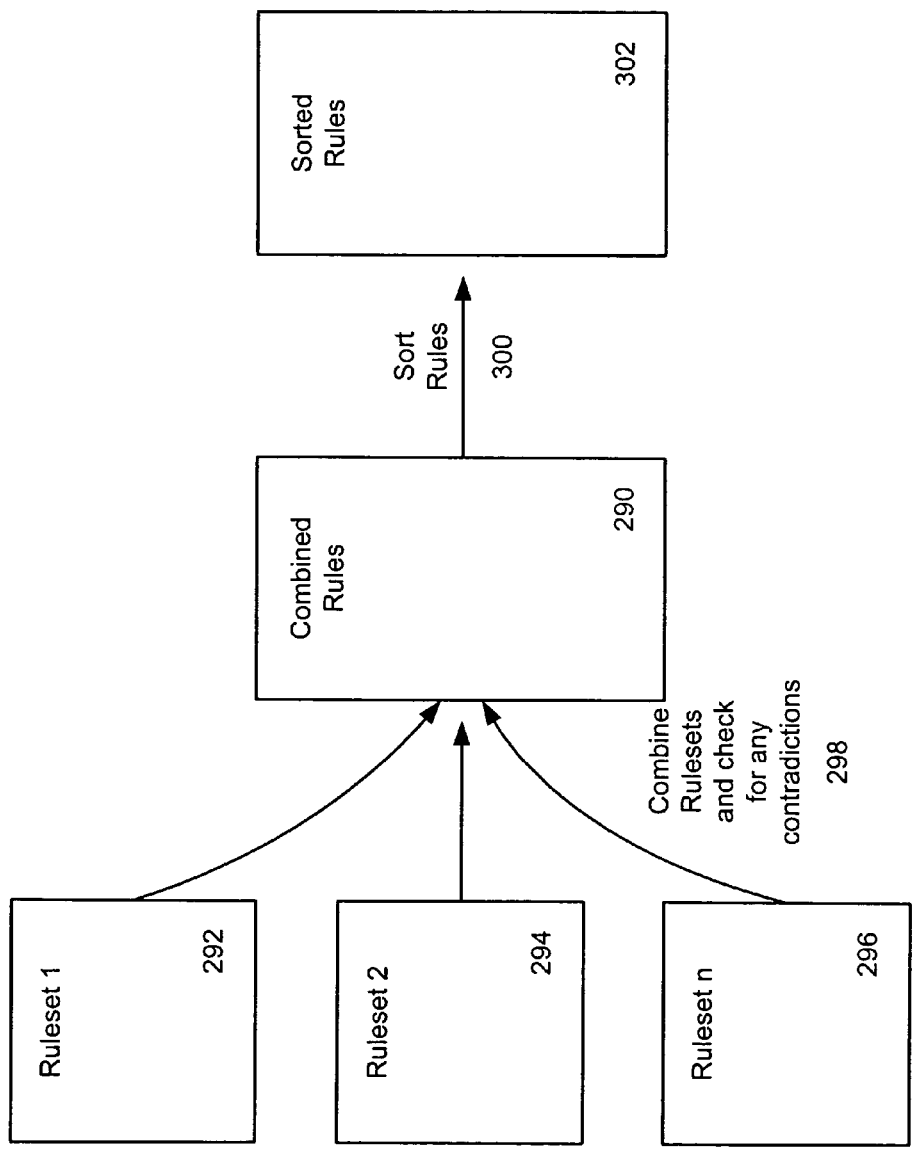
FIG. 9 shows an illustration showing how multiple rulesets may be used in accordance with an embodiment of the invention.

In practice, the set of rules may be under the control of an individual software developer or development team. During compilation, dependencies between the software modules can be identified, and in accordance with an embodiment of the invention, checked against a set of rules. As shown in FIG. 9, the total set of rules 302 themselves can be gathered from multiple sources 292, 294, 296 to form 298 a set of combined rules 290, checked for consistencies, and sorted or rewritten for efficiency, to form a single, consistent, sorted ruleset 302 that is then used as an automatic part of the compilation process to produce the report such as is shown in FIG. 8 above. In this way, each of the software modules can be independently developed with less concern that the calls they either make to other modules, or allow from other modules, or objects will contravene the architecture rules laid down for the development of the entire software project or system. When a rule, and a proposed change to the code seem to both be reasonable alternatives, a system architect may have the final say as to which one should trump the other. Then either the code, or the rules must be updated to reflect that decision.

Extended Language Constructs

In accordance with an embodiment of the invention, the IDARWIN module architecture specification language offers the user additional constructs in addition to the core language rules. As shown below, p and q can be patterns or names bound to patterns. Some additional statements include:
ALLOW p TO q
PREVENT p TO q
LAYER p ABOVE q ABOVE r . . .
STRICTLYLAYER p ABOVE q ABOVE r . . .
ISOLATE p FROM q FROM r . . .
BOTTOM p, q, . . .
TOP p, q, . . .
HIDE p OUTSIDE q, where $p \leq_r q$ To aid the structuring of large specifications, patterns can be bound to a name, so as to allow them to be reused. Bindings can be exported and imported to allow sharing of pattern definitions among specification files, for example:
LET n=p IN statement or let . . . END
EXPORT n
IMPORT b FROM n AS b0

To facilitate the IMPORT feature, specifications must be named, hence the first statement in any specification must be "DSPEC name IS . . . ". Any top-level binding exported from specification name can be imported in another specification. In the example 310 shown in FIG. 10, the renaming feature of the import statement is used to avoid name clashes. All bindings are resolved and substituted before the desugaring of statements into core language rules. Hence the core language does not need to know about bindings, LET, EXPORT and IMPORT.

Desugaring Into Core Language Rules and Patterns

The meaning of each statement type of the extended language is described in further detail below by describing how that statement type is desugared into core language rules and patterns.

The ALLOW and PREVENT statement are passed on to the core language unchanged, except for the resolution of bindings into patterns. For example the lib binding in ALLOW com.foo.* TO lib statement in the above example is resolved and the core-language rule results.

```
ALLOW com.foo.* ((((com.rsys.common.*)
    +antlr.*)
    +java.*)
    +com.apache.*)
```

Layer and Strictlylayer

LAYER and STRICTLYLAYER take an ordered list of patterns as arguments. The patterns capture the layers of the module-architecture stack. The first pattern is assumed to be the top of the layering stack, the last element is at the bottom. LAYER p ABOVE q ABOVE r will be rewritten into three core language PREVENT rules: PREVENT r q, PREVENT r p and PREVENT q p. These three rules prevent any "upward" pointing dependencies, ensuring that lower layers do not depend on any of the layers above them.

In the STRICTLYLAYER case, an additional 4th rule is generated: PREVENT p r. This rule ensures that layers can only depend on the layer immediately below them and cannot depend on any layer further down.

Note that LAYER and STRICLTYLAYER do not imply that there's no other pieces of software above and below the top and bottom layer-element, as the pictorial representation of layers does. To capture this, the TOP and BOTTOM statements can be used (described below), which are then composed with the LAYER and STRICTLYLAYER statements.

Isolate

ISOLATE takes a set of patterns, where each patterns might for example represent a subsystem. ISOLATE p FROM q FROM r will be rewrite into six core language PREVENT rules that prevent each pair or patterns to refer to each other: PREVENT r q, PREVENT r p, PREVENT q r, PREVENT q r, PREVENT p r, PREVENT p q.

Interestingly ISOLATE p FROM q FROM r can be implemented as a combination of LAYER statements. Write ISOLATE [p, q, r] as ISOLATE I, then desugar ISOLATE I=(desugar LAYER I) U (desugar LAYER reverse I).

Bottom and Top

The TOP and BOTTOM statements take a pattern and are rewritten into two core language rules. TOP p is desugared into PREVENT * p and ALLOW p p. BOTTOM p is desugared into PREVENT p * and ALLOW p p.

The purpose of TOP p is to express the fact that p is at the very top of the module hierarchy and no other module (other than p), itself should refer to p. The purpose of BOTTOM p is analogous to express the fact that p is at the very bottom of the module hierarchy and must itself not refer to any other module (except itself). BOTTOM is most useful to make sure a library is tagged as such.

BOTTOM p is a stronger statement than LAYER . . . ABOVE p, since the latter only prevents dependencies from p into upper-layers that are named in the LAYER statement, whereas the BOTTOM statement prevents p from depending on any code other than itself.

TOP p is not implied by LAYER p ABOVE . . . . Both are needed to capture the meaning of the familiar (but ambiguous) graphical layered diagrams.

Hide

HIDE p OUTSIDE q requires $p \leq_r q$ and is used to hide "internal" packages. For example: HIDE com.foo.internal.* OUTSIDE com.foo.* will make sure that no dependency from e.g. com.bar.* can reach into the internal package com.foo.internal.*. Only com.foo and it's subpackages (including com.foo.internal) are allowed to depended on the internal package.

HIDE p OUTSIDE q is desugared into a single core language rule: PREVENT (*-q) p. For example HIDE com.foo.internal.* OUTSIDE com.foo.* results in the rule PREVENT PREVENT (*-com.foo.*) com.foo.internal.*.

Figure 11:
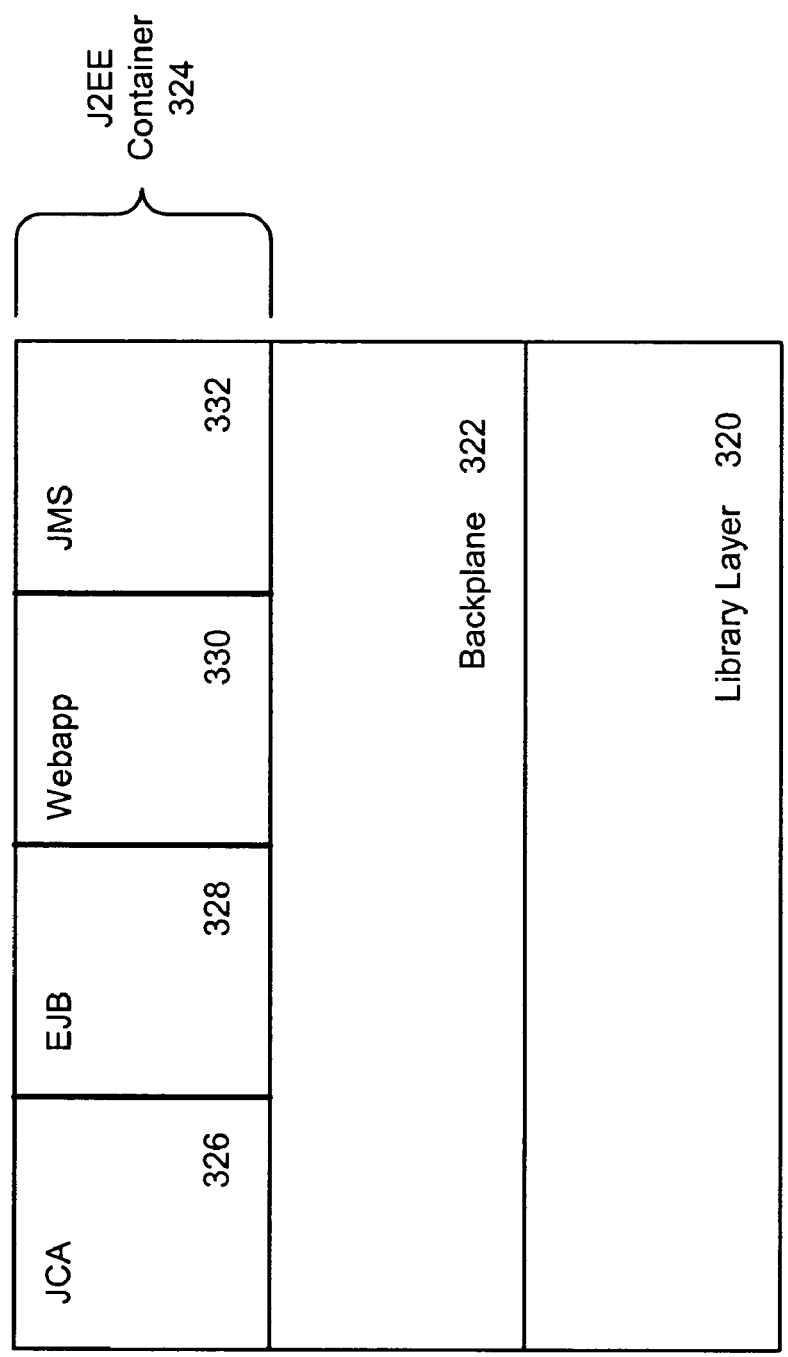
FIG. 11 shows an illustration of modules within layers, as may be used in accordance with an embodiment of the invention.

FIG. 11 illustrates one example of how the LAYER and ISOLATE features can be used to constrain a layering architecture in a software project or enterprise system. The LAYER feature allows layers, such as a library layer 320, backplane layer 322, and connector layer 324, to be logically created as a layering stack. The ISOLATE feature can be used to isolate subsystems, such as JCA (JAVA™ CONNECTOR ARCHITECTURE) 326, EJB (ENTERPRISE JAVA™ BEAN) 328, Webapp 330, and JMS (JAVA™ MESSAGING SYSTEM) 332 subsystems within, for example, a specific layer such as the J2EE (JAVA™ 2 ENTERPRISE EDITION) connector layer shown.

Additional Embodiments

Additional embodiments fall into two categories—improving the toolkit and extending the specification language. Once a specification is written for a subsystem, it tends to be relatively stable and to change slowly compared to the changes to the code itself. Hence one option is to separate the specification processing steps ("specification compiler" tool) from the code-dependency checking step ("compliance checker"). Specialized compliance checkers will be written—one for commandline use, and others that integrate tightly with popular IDEs, ideally reading their internal "code dependency" representations directly.

Another option is the use of generic statements. Experience shows that the HIDE p OUTSIDE q statement in particular is often used in a similar way for multiple subsystems. The particular idiom states that "internal" types in a subsystem shall not be referred to from the "outside" of the subsystem. Rather than repeating such a conventions for each subsystem, the overall specification may be clearer and more maintainable if one expresses the above idiom with a single rule, such as . . .
GENERIC HIDE com.foo.subsystem.*.internal.*
OUTSIDE com.foo.subsystem.*
WHERE subsystem MATCHES #
. . .

To instantiate generic statements IDARWIN needs to find the package names that match the most specific pattern in the generic statement. For example, the package of class com.foo.ejb.internal. A would match the generic statement pattern (the # pattern matches the dotless ejb), leading to an instantiation of the specific statement, substituting ejb for subsystem. The most specific pattern is used to instantiate the generic statement, so that no specific, obsolete (don't match any dependency) statements are generated.

To implement generic statements, IDARWIN needs access to the package structure of a project to instantiate specific rules. One embodiment of the current system performs this via two passes over the code-dependencies. The first pass, just after the specification-parsing phase, reads all dependencies and finds all package names that match a generic statement, instantiating additional specific statements. IDARWIN reads the code-dependencies a second time to check them against the core-language rules.

Reading the code-dependencies to find all package names in order to instantiate generic rules is at odds with the aim of separating the "specification compilation" phase from the "compliance checking" phase because now the former would need to know the actual dependencies that will be checked in the second phase. This is only an issue for a commandline "batch" version of the system. An IDE version of IDARWIN is able to notice changes to the package structure of a project, without having to see all code-dependencies through IDE callbacks in the even of package additions, renaming and deletion.

INDUSTRIAL APPLICABILITY

The IDARWIN system in accordance with an embodiment of the invention provides a module architecture specification language, and a toolkit to check code for specification compliance. The specification language allows for the safe composition of independently authored specifications, by automatically detecting contradictory statements and by ordering the statements by "specificness". As a result developers and architects can structure large specifications into "structural concerns" that each focus on overall-groundrules and subsystems. They can adapt specification fragments without the danger of unintentionally affecting the meaning of other specification sections. The specification language successfully strikes a balance between expressiveness and effort to learn. Users may pick up the language instantly, and the specification language is able to capture real world module architectures of large systems. IDARWIN is designed to be used in a fast moving development environment, where frequent code structure improvements through refactoring require a lightweight specification language. In particular, module architecture specifications can be used to:

express the intent of an ongoing refactoring project, where they allow progress to become visible at a high level of abstraction;

capture the rationale behind a module architecture and package naming conventions in a concise way, so that new team-members grasp the "groundrules" of a project quickly and so that the structure does not deteriorate over time ("dependency creep");

experiment with different module structures by "overlaying" improved candidate structures on existing code. New code-modules can be defined using union and difference-patterns, without having to alter existing code.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while embodiments of the invention have been described herein with respect to a J2EE application server or WebLogic™ environment, that embodiments and implementations may also be used with other application servers, and with other computing environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for maintaining compliance among a plurality of software modules comprising:

a plurality of software modules that together form a software project, and which include dependencies between at least two or more of said software modules;

a plurality of specifications that are associated with said plurality of software modules, including a first specification associated with a first software module and a second specification associated with a second software module, and wherein for each software module the associated specification specifies rules defining any dependencies that are allowed, forbidden, or required within that software module; and a microprocessor that combines the rules from the plurality of specifications to form a set of ordered rules for the software project, including resolving any conflicts between different specifications for different software modules, and then checks the compliance of any dependencies within the software project against said set of ordered rules, wherein the step of resolving includes one of applying rules that specify which of the first specification and the second specification has precedence, and, parsing the specifications for explicit precedence statements.

2. The system of claim 1 further comprising:

an output device that outputs the results from the microprocessor in checking the compliance of dependencies within the software project against said set of ordered rules.

3. The system of claim 1 wherein said plurality of software modules are components of an enterprise system.

4. The system of claim 1 wherein each one of said software modules are is a logical subsystem of an application server.

5. The system of claim 1 wherein said software modules are software objects.

6. The system of claim 1 wherein said software modules are JAVA™ programming language objects.

7. The system of claim 1 wherein said software modules are JAVA™ programming language source or class files.

8. The system of claim 1 wherein each module includes a specification associated therewith.

9. The system of claim 1 wherein a plurality of modules is associated with a particular specification within said plurality of specifications.

10. The system of claim 1 wherein a module is associated with a plurality of specifications within said plurality of specifications.

11. The system of claim 1 wherein said plurality of specifications are checked by the microprocessor for contradictions, and any contradictions between the plurality of specifications are resolved prior to forming the ordered rules.

12. The system of claim 1 wherein each of said plurality of specifications includes a compound or extended language statement that is then desugared by the microprocessor into a set of core rules or statements prior to forming the ordered rules.

13. A method for maintaining compliance among a plurality of software modules, comprising the steps of:

reading a plurality of software modules that together form a software project and which include dependencies between at least two or more of said software modules;

reading a plurality of specifications that are associated with said plurality of software modules, including a first specification associated with a first software module and a second specification associated with a second software module, and wherein for each software module the associated specification specifies rules defining any dependencies that are allowed, forbidden, or required within that software module; and combining, using a microprocessor, the rules from the plurality of specifications to form a set of ordered rules for the software project, including resolving any conflicts between different specifications for different software modules, and then checking the compliance of any dependencies within the software project against said set of ordered rules, wherein the step of resolving includes one of applying rules that specify which of the first specification and the second specification has precedence, and, parsing the specifications for explicit precedence statements.

14. The method of claim 13 further comprising:

outputting the results from the microprocessor in checking the compliance of dependencies within the software project against said set of ordered rules.

15. The method of claim 13 wherein said software modules are a component of an enterprise system.

16. The method of claim 13 wherein said software modules are a logical subsystem of an application server.

17. The method of claim 13 wherein said software modules are software objects.

18. The method of claim 13 wherein said software modules are JAVA™ programming language objects.

19. The method of claim 13 wherein said software modules are JAVA™ programming language source or class files.

20. The method of claim 13 wherein each module includes a specification associated therewith.

21. The method of claim 13 wherein a plurality of modules is associated with a particular specification.

22. The method of claim 13 wherein a module is associated with a plurality of specifications.

23. The method of claim 13 wherein said specifications are checked by the microprocessor for contradictions, and any contradictions are resolved prior to forming the ordered rules.

24. The method of claim 13 wherein said specifications include a compound or extended language statement that is then desugared by the microprocessor into a set of core rules or statements prior to forming the ordered rules.

25. A system for maintaining compliance among a plurality of software modules comprising:

a plurality of software modules, including a first software module and a second software module that together form a software project, and which includes dependencies between the first software module and the second software module;

a plurality of specifications that are associated with said plurality of software modules, including a first specification associated with the first software module, and a second specification associated with the second software modules, wherein each of the plurality of specifications defines dependency rules and explicit precedence statements for the associated module;

a set of resolving rules that specify which dependency rules have precedence, and which of the first specification and the second specification has precedence; and a microprocessor that upon a request to build the software project combines the dependency rules from the plurality of specifications to create a set of ordered rules for the software project, uses the resolving rules to resolve conflicts between the dependency rules in the first specification and the second specification, and checks the compliance of any dependencies within the software project against the set of ordered rules.

26. The system of claim 25 wherein, for each software module, the associated specification defines dependency rules for the module including any allowed, forbidden, or required dependencies within that software module.

27. The system of claim 25 wherein, for each software module, the associated specification defines dependency rules for the module including any allowed, forbidden, or required dependencies between that software module and another software module.

28. The system of claim 25 wherein the resolving rules include rules that specify which of the first specification and the second specification has precedence.

29. The system of claim 25 wherein each of the first specification and the second specification includes explicit precedence statements that determine which dependency rules take precedence over another.

30. A method for maintaining compliance among a plurality of software modules comprising the steps of:

reading a plurality of software modules, including a first software module and a second software module that together form a software project, and which includes dependencies between the first software module and the second software module;

parsing a plurality of specifications that are associated with said plurality of software modules, including a first specification associated with the first software module, and a second specification associated with the second software modules, wherein each of the plurality of specifications defines dependency rules and explicit precedence statements for the associated module;

parsing a set of resolving rules that specify which dependency rules have precedence, and which of the first specification and the second specification has precedence; and combining, using a microprocessor, the dependency rules from the plurality of specifications to create a set of ordered rules for the software project, using the resolving rules to resolve conflicts between the dependency rules in the first specification and the second specification, and checking the compliance of any dependencies within the software project against the set of ordered rules.

31. The system of claim 30 wherein, for each software module, the associated specification defines dependency rules for the module including any allowed, forbidden, or required dependencies within that software module.

32. The system of claim 30 wherein, for each software module, the associated specification defines dependency rules for the module including any allowed, forbidden, or required dependencies between that software module and another software module.

33. The system of claim 30 wherein the resolving rules include rules that specify which of the first specification and the second specification has precedence.

34. The system of claim 30 wherein each of the first specification and the second specification includes explicit precedence statements that determine which dependency rules take precedence over another.

* * * * *